United States Patent
Sathish et al.

(10) Patent No.: US 10,404,764 B2
(45) Date of Patent: Sep. 3, 2019

(54) METHOD AND APPARATUS FOR CONSTRUCTING LATENT SOCIAL NETWORK MODELS

(75) Inventors: Sailesh Sathish, Tampere (FI); Jilei Tian, Beijing (CN)

(73) Assignee: Nokia Technologies Oy, Espoo (FI)

(*) Notice: Subject to any disclaimer, the term of this patent is extended or adjusted under 35 U.S.C. 154(b) by 286 days.

(21) Appl. No.: 14/428,231

(22) PCT Filed: Sep. 14, 2012

(86) PCT No.: PCT/CN2012/081386
§ 371 (c)(1),
(2), (4) Date: Mar. 13, 2015

(87) PCT Pub. No.: WO2014/040266
PCT Pub. Date: Mar. 20, 2014

(65) Prior Publication Data
US 2015/0256569 A1 Sep. 10, 2015

(51) Int. Cl.
*H04L 29/06* (2006.01)
*G06F 16/28* (2019.01)
(Continued)

(52) U.S. Cl.
CPC .......... *H04L 65/403* (2013.01); *G06F 16/288* (2019.01); *G06Q 50/01* (2013.01); *H04L 67/306* (2013.01)

(58) Field of Classification Search
CPC ................. H04L 65/403; H04L 67/306; G06F 17/30604; G06Q 50/01
(Continued)

(56) References Cited

U.S. PATENT DOCUMENTS

| 7,987,110 B2 | 7/2011 | Cases et al. |
| 2010/0241698 A1 | 9/2010 | Hillerbrand |

(Continued)

FOREIGN PATENT DOCUMENTS

| CN | 102223393 A | 10/2011 |
| CN | 102594905 A | 7/2012 |

(Continued)

OTHER PUBLICATIONS

International Search Report and Written Opinion for Application No. PCT/CN2012/081386 dated Jun. 6, 2013.
(Continued)

*Primary Examiner* — Wing F Chan
*Assistant Examiner* — Leon Y Tseng
(74) *Attorney, Agent, or Firm* — Alston & Bird LLP

(57) ABSTRACT

An approach is provided for constructing dynamic latent models that determine consumer/social network intrinsic properties and automatically recommend user interactions with different social networks. A modeling platform determines one or more social networks associated with one or more users, one or more devices associated with the one or more users, or a combination thereof. A modeling platform processes and/or facilitates a processing of data associated with the one or more social networks to generate one or more latent models describing the one or more social networks. A modeling platform causes, at least in part, a presentation of a recommendation to interact with the one or more social networks, one or more other social networks, or a combination thereof based, at least in part, on the one or more latent models.

20 Claims, 10 Drawing Sheets

(51) Int. Cl.
*G06Q 50/00* (2012.01)
*H04L 29/08* (2006.01)

(58) Field of Classification Search
USPC .......................................................... 709/204
See application file for complete search history.

(56) References Cited

U.S. PATENT DOCUMENTS

| | | | |
|---|---|---|---|
| 2010/0257028 A1 | 10/2010 | Hillerbrand | |
| 2010/0287033 A1* | 11/2010 | Mathur | G06F 17/30867 |
| | | | 705/319 |
| 2011/0258203 A1 | 10/2011 | Wouhaybi et al. | |
| 2013/0073485 A1* | 3/2013 | Sathish | G06Q 30/02 |
| | | | 706/12 |
| 2014/0068692 A1* | 3/2014 | Archibong | H04L 65/4084 |
| | | | 725/116 |

FOREIGN PATENT DOCUMENTS

| | | |
|---|---|---|
| WO | WO 2009/085602 A1 | 7/2009 |
| WO | WO 2010/008685 A2 | 1/2010 |
| WO | WO 2011/117463 A1 | 9/2011 |
| WO | WO 2011/121176 A1 | 10/2011 |

OTHER PUBLICATIONS

Blei, D. M. et al., Hierarchical Topics Models and the Nested Chinese Restaurant Process, NIPS (2003) 8 pages.
De Luca, E., Personalization and Context-awareness in Retrieval and Recommender Systems, ITWP 2011 workshop (Jul. 16, 2011, 56 pages.
Jiang, J. et al., Understanding Latent Interactions in Online Social Networks, ICM'10 ( November 2010) 14 pages.
Xu, A. et al., Dynamic Social Network Analysis Using Latent Space Model and as Integrated Clustering Algorithm, 2009 Eighth IEEE International Conference on Dependable, Autonomic and Secure Computer (2009) 620-625.

* cited by examiner

METHOD AND APPARATUS FOR CONSTRUCTING LATENT SOCIAL NETWORK MODELS

BACKGROUND

Service providers and device manufacturers (e.g., wireless, cellular, etc.) are continually challenged to deliver value and convenience to consumers by, for example, providing compelling network services. One area of interest has been the development of social networking services that support and promote the increasing social nature of users. On one hand, social networks are increasingly becoming diversified and fragmented to meet the different needs of consumers. On the other hand, consumers are increasingly joining more and more social networks with different content and friends among the networks, though some overlap exists. This creates a challenge for a consumer to interact with multiple social networks (e.g., sharing content to multiple social networks, retrieving relevant information from several social networks, and discovering new relevant social networks, subtopics, threads, etc.). At the same time, most users still require privacy in terms of where and how to post and/or retrieve content, particularly since many users interact with different appearances among the different social networks (e.g., unique usernames, avatars, etc.). A solution to this challenge requires centralized holistic social network modeling and management. However, the considerable time and effort required to keep up-to-date with the always changing content, discover new and relevant networks subtopics, threads, etc., and manually set one or more personal preferences among the one or more social networks reduces the overall user experience. Accordingly, service providers and device manufacturers face significant technical challenges in providing a service that determines consumer/social network intrinsic properties and automatically recommends user interactions with different social networks.

SOME EXAMPLE EMBODIMENTS

Therefore, there is a need for an approach for constructing dynamic latent models that determine consumer/social network intrinsic properties and automatically recommend user interactions with different social networks.

According to one embodiment, a method comprises determining one or more social networks associated with one or more users, one or more devices associated with the one or more users, or a combination thereof. The method also comprises processing and/or facilitating a processing of data associated with the one or more social networks to generate one or more latent models describing the one or more social networks. The method further comprises causing, at least in part, a presentation of a recommendation to interact with the one or more social networks, one or more other social networks, or a combination thereof based, at least in part, on the one or more latent models.

According to another embodiment, an apparatus comprises at least one processor, and at least one memory including computer program code for one or more computer programs, the at least one memory and the computer program code configured to, with the at least one processor, cause, at least in part, the apparatus to determine one or more social networks associated with one or more users, one or more devices associated with the one or more users, or a combination thereof. The apparatus is also caused to process and/or facilitate a processing of data associated with the one or more social networks to generate one or more latent models describing the one or more social networks. The apparatus further causes, at least in part, a presentation of a recommendation to interact with the one or more social networks, one or more other social networks, or a combination thereof based, at least in part, on the one or more latent models.

According to another embodiment, a computer-readable storage medium carries one or more sequences of one or more instructions which, when executed by one or more processors, cause, at least in part, an apparatus to determine one or more social networks associated with one or more users, one or more devices associated with the one or more users, or a combination thereof. The apparatus is also caused to process and/or facilitate a processing of data associated with the one or more social networks to generate one or more latent models describing the one or more social networks. The apparatus further causes, at least in part, a presentation of a recommendation to interact with the one or more social networks, one or more other social networks, or a combination thereof based, at least in part, on the one or more latent models.

According to another embodiment, an apparatus comprises means for determining one or more social networks associated with one or more users, one or more devices associated with the one or more users, or a combination thereof. The apparatus also comprises means for processing and/or facilitating a processing of data associated with the one or more social networks to generate one or more latent models describing the one or more social networks. The apparatus further comprises means for causing, at least in part, a presentation of a recommendation to interact with the one or more social networks, one or more other social networks, or a combination thereof based, at least in part, on the one or more latent models.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of claims 1-9.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for constructing dynamic latent models that determine consumer/social network intrinsic properties and automatically recommend user interactions with different social networks are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
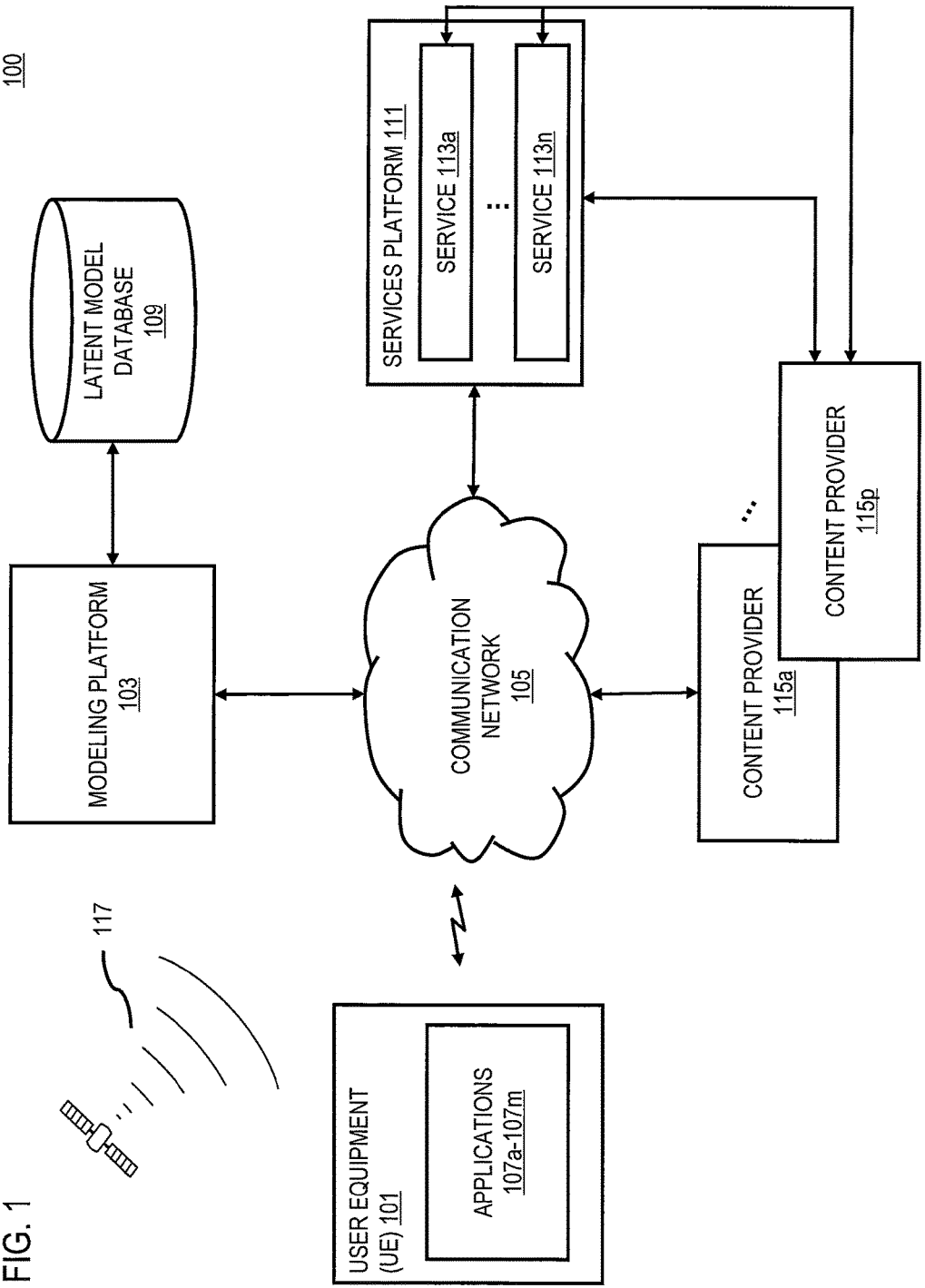
FIG. 1 is a diagram of a system capable of constructing dynamic latent models that determine consumer/social network intrinsic properties and automatically recommend user interactions with different social networks, according to one embodiment.

FIG. 1 is a diagram of a system capable of constructing dynamic latent models that determine consumer/social network intrinsic properties and automatically recommend user interactions with different social networks, according to one embodiment. As previously discussed, one area of interest among service providers and device manufacturers has been the development of social networking services that support and promote the increasing social nature of users. On one hand, social networks are increasingly becoming diversified and fragmented to meet the different needs of consumers. On the other hand, consumers are increasingly joining more and more social networks with different content and friends among the networks, though some overlap exists. This creates a challenge for a consumer to interact with multiple social networks (e.g., sharing content to multiple social networks, retrieving relevant information from several social networks, and discovering new relevant social networks, subtopics, threads, etc.). At the same time, most users still require privacy to determine where and how to post and/or retrieve content, particularly since many users interact with different appearances among the different networks (e.g., unique usernames, avatars, etc.). A solution to this challenge requires centralized holistic social network modeling and management. However, the considerable time and effort required to keep up-to-date with the always changing content and to manually set one or more personal preferences among the one or more social networks reduces the overall user experience.

To address this problem, a system 100 of FIG. 1 introduces the capability to construct dynamic latent models that determine consumer/social network intrinsic properties and automatically recommend user interactions with different social networks. In one embodiment, the system 100 first determines one or more social networks associated with one or more users, one or more devices (e.g., a mobile phone or a tablet) associated with the one or more users, or a combination thereof. By way of example, the one or more social networks include, at least in part, one or more social networking services (e.g., FACEBOOK, LINKEDIN, etc.), one or more blogging services (e.g., TWITTER), one or more mass messaging services, a contact list, alumni, colleague, or professional networks, etc. In one example use case, the system 100 may determine the one or more social networks based, at least in part, on a user logging into the system 100 and manually selecting the one or more social networks that he or she is associated with.

In one or more embodiments, the system 100 next determines one or more credentials, one or more network profiles, or a combination thereof associated with the one or more users for the one or more social networks. More specifically, the one or more credentials may include, at least in part, a login, a username, a password, etc. and the one or more network profiles may include, at least in part, a user profile, user interest information, or a combination thereof. In one embodiment, the system 100 then determines a quorum of the one or more credentials, the one or more network profiles, or a combination thereof. In particular, once the system 100 determines a quorum (e.g., a quorum of 10 users), the system 100 can start analyzing or mining the one or more corresponding social networks for available data (i.e., data specific to the one or more users that have provided credentials and given the limitations on access to data placed by the one or more applicable social networks). However, it is contemplated that the system 100 will function more effectively when the system 100 has access to thousands of the one or more credentials, the one or more network profiles, or a combination thereof.

In one embodiment, the system 100 processes and/or facilitates a processing of the one or more credentials, the one or more network profiles, or a combination thereof to determine content associated with the one or more users. More specifically, the system 100 can determine one or more user posts, one or more posts by friends available to the user, one or more group posts available to the user, etc., including textual and/or multimedia content. By way of example, the system 100 may determine that a user recently posted a photograph of a fjord in Norway (e.g., based on a description, metadata, global positioning system (GPS), etc.) that the user may want to share with his or her friends. The system 100 may also determine that there are one or more ongoing discussions about current events or politics or that a user recently posted scores related to a sporting event, etc. In addition, the system 100 may also determine that one or more users recently viewed content associated with the one or more social networks (e.g., on a personal homepage).

In one or more embodiments, the system 100 next determines one or more hierarchical levels of description for the one or more social networks, the one or more other social networks (e.g., one or more social networks that the user may not belong to, but may have limited access to), or a combination thereof. In particular, the system 100 can determine the formal attributes of the one or more social networks (i.e., what the network is about) and then organize, for example, the one or more levels of the one or more social networks as follows: general social network>topic lists>subtopic lists>group descriptions>user descriptions, etc. By way of example, the system 100 can determine that on a particular social network (e.g., a social networking service) one or more users associated with that social network have posted information (e.g., in a discussion) under the heading "technology" and then within that discussion determine that there may be one or more fine-grained discussions (e.g., hardware>monitor, software>memory, artificial intelligence>machine learning, etc.).

In one embodiment, the system 100 then processes and/or facilitates a processing of data associated with the one or more social networks to generate one or more latent models describing the one or more social networks. In particular, the data can include information about the one or more social networks (e.g., formal attributes) as well as textual and/or multimedia content posted by the one or more users associated with the one or more social networks. For example, the one or more latent models generated by the system 100 can describe the one or more social networks in terms of content type, titles, and categories as well as types of users, etc. At a minimum, the one or more latent models include, at least in part, at least one topic list, at least one index, or a combination thereof associated with the one or more hierarchical levels. Moreover, the system 100 generates the one or more latent models based, at least in part, on one or more sets of latent vectors. It is contemplated that latent vectors are well suited for network categorization and maintaining user privacy because the vectors have a low factor representation, make sense only to the system 100 (i.e., they have no inherent meaning), enable the transmission of data as either explicit representations of descriptions or ambiguous latent factors, etc.

In one or more embodiments, the system 100 causes, at least in part, the generation of the one or more latent models based, at least in part, on the one or more hierarchical levels. More specifically, the one or more latent models describe each hierarchical level of the one or more social networks. For example, the one or more latent models may be complimentarily organized by the system 100 as follows: general latent model>a topic list latent model>a subtopic list latent model>a group description latent model>user latent models, etc. Moreover, the system 100 can cause, at least in part, an association between each topic of the one or more social networks and the at least one index, wherein each subtopic list latent model, each group description latent model, and so forth would also be associated with and point to the index.

In certain embodiments, the system 100 causes, at least in part, the generation of the one or more latent models based, at least in part, on the quorum. For example, when the system 100 determines a quorum of the one or more users (i.e., a quorum of latent signatures or latent vectors), the system 100 can determine the common data among all of the one or more users or among a subset of the one or more users resulting in common latent data that the system 100 can then extract and use to describe the one or more corresponding social networks in latent terms. However, the system 100 may be provided access to other data as well by the one or more social networks and the data that the system 100 processes is only limited by the level of access to that data that the one or more social networks provide to the system 100.

In one or more embodiments, the system 100 next causes, at least in part, a presentation of a recommendation to a user in substantially real-time, for example, to interact with the one or more social networks, the one or more other social networks, or a combination thereof based, at least in part, on the one or more latent models. In particular, the system 100 determines the recommendation based, at least in part, on a relevancy, a service rating/popularity, a degree of privacy, etc. of the one or more social networks. By way of example, the system 100 can recommend where to post a certain content to get the maximum number of reads or to target specific users or the system 100 can recommend to the one or more users one or more other social networks to join based, at least in part, on the type of content the user wants to post or utilize. In one example use case, if the system 100 knows the type of content and/or the one or more users that a user has previously shared similar content with (e.g., vacation photographs), then the system 100 can recommend one or more interactions with one or more relevant social networks (e.g., a photography discussion, friends and family, etc.). Further, in one or more embodiments, based on the one or more credentials, the one or more network profiles, or a combination thereof, the system 100 can automatically initiate the recommended interaction with the one or more social networks.

In one embodiment, once the system 100 generates the one or more latent models, the system 100 can determine at least one interaction with one or more applications rendering content on the one or more devices (e.g., a web browser, a word processing program, etc.), wherein the recommendation is further based, at least in part, on the at least one interaction. For example, the at least one interaction may include reading content on one or more social networks (e.g., a social networking service), writing or posting content on one or more social networks, or a combination thereof. In one example use case, if the system 100 determines that a user is reading something on a device (e.g., travel information about the fjords of Norway), then the system 100 can recommend that the user follow a particular discussion on the relevant one or more social networks, one or more other social networks, or a combination thereof. Similarly, in another example use case, if the system 100 determines that a user is writing content on a blog, on a social networking service (e.g., a personal homepage), or a combination thereof, the system 100 can recommend to the user relevant one or more social networks, one or more other social networks, or a combination thereof to post the material. In particular, it is contemplated that the one or more applications running on the one or more devices provide the one or more devices access to the relevant application data and provide the one or more devices with an interface through which the system 100 can provide one or more recommendations. Thereafter, one or more applications can determine specifically how the one or more recommendations are rendered to the user.

In one or more embodiments, the system 100 also determines additional content associated with the one or more users, the one or more social networks, or a combination thereof. For example, a user may post new information or content throughout a day to a social network (e.g., status updates, replies to friends' posts, etc.) or the user may start a new discussion thread based on the one or more previous discussions (e.g., starting a machine learning discussion within a technology topic). In one embodiment, the system 100 then causes, at least in part, one or more updates of the one or more corresponding latent models based, at least in part, on the additional content. In particular, one or more subsets of latent models on a local device (e.g., a mobile phone or a tablet) can also be updated by the system 100 based, at least in part, on user interaction from a larger latent model (e.g., a general latent model) on a network server, for example. As a result, the system 100 ensures that the one or more latent models are up-to-date with all of the descriptive information available so that the one or more latent model topics are recent and the one or more social network descriptions are accurate (i.e., the one or more latent models are dynamic).

In one example use case, a user "A" has updated his or her comments on a popular musician on a particular social network before (e.g., social networking service "L"). As a result, when a comment from another user, user "B" for example, is also posted to one or more social networks, the system 100 can recommend to user "A" that he or she view the new comment or even automatically share the comment with user "A" on the social networking services "L". More specifically, it is contemplated that within the system 100 there are "M" users and "N" items/actions being interacted with during a given time period. The system 100 can abstract and map the "N" items/actions into "P" features in comparable semantic space, so the "M*N" matrix is transformed into the "M*P" matrix. The system 100 can then model the one or more social networks across P features using supervised learning, for example. Next, the system 100 can apply collaborative filtering (CF) techniques, for example, to the new "M*P" matrix to fill in any missing values so that each user (u) will have a set of relevant features (k) describing his or her preferences in semantic space. Thereafter, the system 100 can determine the strength of preference "u" gives to feature "k" based, at least in part, on a determination of each element (u, k) in the "M*P" matrix. As a result, the system 100 can recommend any new item/action (i) to "u" based, at least in part, on the extent to which the features of "i" are similar to the features of "u". All in all, the system 100 can holistically model users, social networks, items/actions, or a combination thereof in the commonly used semantic space.

In certain embodiments, the system 100 determines one or more preloaded latent models on the one or more devices (e.g., a mobile phone or a tablet). More specifically, the one or more preloaded latent models are a subset of the one or more general latent models generated or acquired by the system 100 and may include, at least in part, generic topics such as shopping, technology, sports, news, entertainment, etc. In one or more embodiments, once the one or more network preferences of the one or more users become clearer to the system 100 (e.g., over some period of time), the system 100 can cause, at least in part, at least one modification of the one or more preloaded latent models on one or more devices based, at least in part, on the one or more credentials, the one or more network profiles, or a combination thereof associated with the one or more users. In particular, the at least one modification can occur periodically, according to a schedule, on demand, or a combination thereof. For example, the system 100 may determine that the one or more preloaded latent models (e.g., relating to shopping) do not comport with one or more network profiles associated with the one or more users. As a result, the system 100 can then cause, at least in part, the particular one or more preloaded latent models to be discarded by the system 100, the device, or a combination thereof.

In one embodiment, the system 100 determines one or more other latent models from the one or more social networks, the one or more other social networks, or a combination thereof, wherein the at least one modification includes, at least in part, an addition of the one or more other latent models to the one or more devices. Again, once the one or more network preferences of the one or more users become clearer to the system 100, the system 100 may request one or more other latent models (e.g., from a database, a third-party, etc.) and then recommend to the one or more users adding the one or more other latent models to the one or more devices.

As shown in FIG. 1, the system 100 comprises a user equipment (UE) 101 (e.g., a mobile phone or a tablet) having connectivity to a modeling platform 103 via a communication network 105. The UE 101 may include or be associated with one or more applications 107a-107m (also collectively referred to as applications 107). By way of example, the applications 107 may include social networking applications, a web browser, media applications (e.g., applications for taking photographs and/or video, recording sounds, etc.), mapping and/or navigation applications, etc.

In one embodiment, the modeling platform 103 may include or be associated with at least one latent model database 109. In one example embodiment, the modeling platform 103 may exist in whole or in part within the UE 101, or independently, and the latent model database 109 may exist in whole or in part within the modeling platform 103, or independently. In particular, the latent model database 109 may include a list of the one or more social networks associated with one or more users, one or more devices associated with one or more users, or a combination thereof. The latent model database 109 may also include one or more credentials, one or more network profiles, or a combination thereof associated with the one or more users for the one or more social networks. Further, the latent model database 109 also may include a list of the one or more other social networks as well as the one or more other latent models from the one or more social networks, the one or more other social networks, or a combination thereof.

The UE 101 is also connected to a services platform 111 via the communication network 105. The services platform 111 includes one or more services 113a-113n (also collectively referred to as services 113). The services 113 may include a wide variety of content provisioning services for the applications 107. By way of example, the services 113 may include social networking services, blogging services, mass messaging services, third-party services for providing one or more latent models of the one or more social networks or a particular segment of one or more the social networks (e.g., a particular topic such as surgery), media services, location-based services, etc. The UE 101, the services platform 111, and the services 113 also have connectivity to one or more content providers 115a-115p (also collectively referred to as content providers 115) via the communication network 105. The content providers 115 also may provision a wide variety of content (e.g., latent models of a social network) to the components of the system 100.

In certain embodiments, the modeling platform 103 or one or more applications 107 may utilize location-based technologies (e.g., a GPS receiver, cellular triangulation, Assisted GPS (A-GPS), etc.) to determine the location of the UE 101. For example, a UE 101 may include a GPS receiver to obtain geographic coordinates from satellites 117 to determine its current location. Thereafter, in one example use case, the modeling platform 103 may cause, at least in part, a presentation of a recommendation of one or more social networks or one or more segments of the one or more social networks based on a position relative to the UE 101. For example, if the modeling platform 103 determines that the UE 101 is near a fjord in Norway, the modeling platform 103 may recommend one or more social networks that include discussions regarding the fjords, Norway, etc.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In one embodiment, the modeling platform 103 first determines one or more social networks associated with one or more users, one or more devices (e.g., a UE 101) associated with one or more users, or a combination thereof. As previously discussed, in one example use case, the modeling platform 103 may determine the one or more social networks based, at least in part, on a user logging into the modeling platform 103 and selecting one or more social networks that he or she is associated with. In one or more embodiments, the modeling platform 103 next determines one or more credentials, one or more network profiles, or a combination thereof associated with the one or more users for the one or more social networks.

In one or more embodiments, the modeling platform 103 then determines a quorum of the one or more credentials, the one or more network profiles, or a combination thereof. In particular, once the system 100 determines a quorum (e.g., a quorum of 10 users), the system 100 can start analyzing or mining the one or more corresponding social networks for available data (i.e., data specific to the one or more users that have provided credentials and given the limitations on access to data placed by the one or more corresponding social networks). However, it is contemplated that the system 100 will function more effectively when the system 100 has access to thousands of the one or more credentials, the one or more network profiles, or a combination thereof.

In one embodiment, the modeling platform 103 processes and/or facilitates a processing of the one or more credentials, the one or more network profiles, or a combination thereof to determine content associated with the one or more users. More specifically, the modeling platform 103 can determine one or more user posts, one or more posts by friends available to the user, one or more group posts available to the user, etc., including textual and/or multimedia content. As previously discussed, in one example use case, the modeling platform 103 may determine that a user recently posted a photograph of a fjord in Norway that the user may want to share with his or her friends. The modeling platform 103 may also determine there are one or more ongoing discussions about current events or politics or that a user recently posted scores related to a sporting event, etc. In addition, the modeling platform 103 may also determine that one or more users recently viewed content associated with the one or more social networks (e.g., a personal homepage).

In one or more embodiments, the modeling platform 103 next determines one or more hierarchical levels of description for the one or more social networks, the one or more other social networks, or a combination thereof. More specifically, the modeling platform 103 can determine the formal attributes of the one or more social networks and then organize, for example, the one or more levels of the one or more social networks as follows: general social network>topic lists>subtopic lists>group descriptions>user descriptions, etc. For example, the modeling platform 103 can determine that on one particular social network (e.g., social networking service) one or more users associated with that social network have posted information under the heading "technology" and then within that discussion determine that there may be one or more fine-grained discussions.

In one embodiment, the modeling platform 103 then processes and/or facilitates a processing of data associated with the one or more social networks to generate one or more latent models describing the one or more social networks. More specifically, the data can include information about the one or more social networks (e.g., formal attributes) as well textual and/or multimedia content posted by the one or more users associated with the one or more social networks. As previously discussed, at a minimum, the one or more latent models include, at least in part, at least one topic list, at least one index, or a combination thereof associated with the one or more hierarchical levels. Moreover, the modeling platform 103 generates the one or more latent models based, at least in part, on one or more sets of latent vectors.

In one or more embodiments, the modeling platform 103 causes, at least in part, the generation of the one or more latent models based, at least in part, on the one or more hierarchical levels. In particular, the one or more latent models describe each hierarchical level of the one or more social networks. By way of example, the one or more latent models may be complimentarily organized by the modeling platform 103 as follows: general latent model>a topic list latent model>a subtopic list latent model>a group description latent model>user latent models, etc. Further, the modeling platform 103 can cause, at least in part, an association between each topic of the one or more social networks and at least one index, wherein each subtopic list latent model, each group description latent model, and so forth would also be associated with and point to the index.

In certain embodiments, the modeling platform 103 causes, at least in part, the generation of the one or more latent models based, at least in part, on the quorum. By way of example, when the modeling platform 103 determines a quorum of the one or more users, the modeling platform 103 can determine the common data among the one or more users or among a subset of the one or more users resulting in common latent data that the modeling platform 103 can then extract and use to describe the one or more corresponding social networks in latent terms. However, the modeling platform 103 may be provided access to other data as well by the one or more social networks and the data that the modeling platform 103 processes is only limited by the level of access to that data that the one or more social networks provide to the modeling platform 103.

In one or more embodiments, the modeling platform 103 next causes, at least in part, a presentation of a recommendation to a user in substantially real-time, for example, to interact with the one or more social networks, the one or more other social networks, or a combination thereof based, at least in part, on the one or more latent models. In particular, the modeling platform 103 determines the recommendation based, at least in part, on a relevancy, a service rating/popularity, a level of privacy, etc. of the one or more social networks. For example, in one example use case, if the modeling platform 103 knows the type of content and/or the one or more users that a user has previously shared similar content with (e.g., vacation photographs), then the modeling platform 103 can recommend one or more interactions with one or more relevant social networks (e.g., a photography discussion, friends and family, etc.). Moreover, in one or more embodiments, based, at least in part, on the one or more credentials, the one or more network profiles, or a combination thereof, the modeling platform 103 can automatically initiate the recommended interaction with the one or more social networks.

In one embodiment, once the modeling platform 103 generates the one or more latent models, the modeling platform 103 can determine at least one interaction with one or more applications 107 rendering content on a UE 101 (e.g., a web browser, a word processing program, etc.), wherein the recommendation is further based, at least in part, on the at least one interaction. By way of example, the at least one interaction may include reading content on the one or more social networks (e.g., a social networking service), writing or posting content on the one or more social networks, or a combination thereof. As previously discussed, in one example use case, if the modeling platform 103 determines that a user in reading something on a UE 101, then the modeling platform 103 can recommend that the user follow a particular discussion on the relevant one or more social networks, one or more other social networks, or a combination thereof. Similarly, in another example use case, if the modeling platform 103 determines that a user is writing content on a blog, on a social networking service (e.g., a personal homepage), or a combination thereof, the modeling platform 103 can recommend to the user relevant one or more social networks, one or more other social networks, or a combination thereof to post the material. More specifically, it is contemplated that the applications 107 running on the UE 101 provide the UE 101 access to the application data and provide the UE 101 with an interface through which the modeling platform 103 can provide one or more recommendations. Thereafter, an application 107 can determine specifically how the one or more recommendations are rendered to the user.

In one or more embodiments, the modeling platform 103 also determines additional content associated with the one or more users, the one or more social networks, or a combination thereof. For example, a user may post new information or content throughout a day to a social network or the user may start a new discussion thread based on the one or more previous discussions. In one embodiment, the modeling platform 103 then causes, at least in part, one or more updates of the one or more corresponding latent models, based at least in part, on the additional content. In particular, one or more subsets of latent models on a local device (e.g., a mobile phone or a tablet) can also be updated by the modeling platform 103 based, at least in part, on user interaction from a larger latent model (e.g., a general latent model) on a network server, for example. Consequently, the modeling platform 103 ensures that the one or more latent models are up-to-date with all of the available descriptive information so that the one or more latent model topics are recent and the one or more social network descriptions are accurate (i.e., the one or more latent models are dynamic).

In certain embodiments, the modeling platform 103 determines one or more preloaded latent models on a UE 101 (e.g., a mobile phone or a tablet). In particular, the one or more preloaded latent models are a subset of the one or more general latent models generated or acquired by the modeling platform 103 and may include, at least in part, generic topics such as shopping, technology, sports, news, entertainment, etc. In one or more embodiments, once the one or more network preferences of the one or more users become clearer to the modeling platform 103 (e.g., over some period of time), the modeling platform 103 can cause, at least in part, at least one modification of the one or more preloaded latent models on a UE 101 based, at least in part, on the one or more credentials, the one or more network profiles, or a combination thereof associated with the one or more users. More specifically, the at least one modification can occur periodically, according to a schedule, on demand, or a combination thereof. By way of example, the modeling platform 103 may determine that the one or more preloaded latent models do not comport with the one or more network profiles associated with a user and, therefore, cause at least in part, the particular one or more preloaded latent models to be discard by the modeling platform 103, the UE 101, or a combination thereof.

In one embodiment, the modeling platform 103 determines one or more other latent models from the one or more social networks, the one or more other social networks, or a combination thereof, wherein the at least one modification includes, at least in part, an addition of the one or more other latent models to the UE 101. Again, once the one or more network preferences of the one or more users becomes clearer to the modeling platform 103, the modeling platform 103 may request one or more other latent models (e.g., from the latent model database 109, the services 113, the content providers 115, etc.) and then recommend to the one or more users adding the one or more other latent models to the UE 101.

By way of example, the UE 101, the modeling platform 103, the applications 107, the services platform 111, the services 113, the content providers 115, and the satellites 117 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
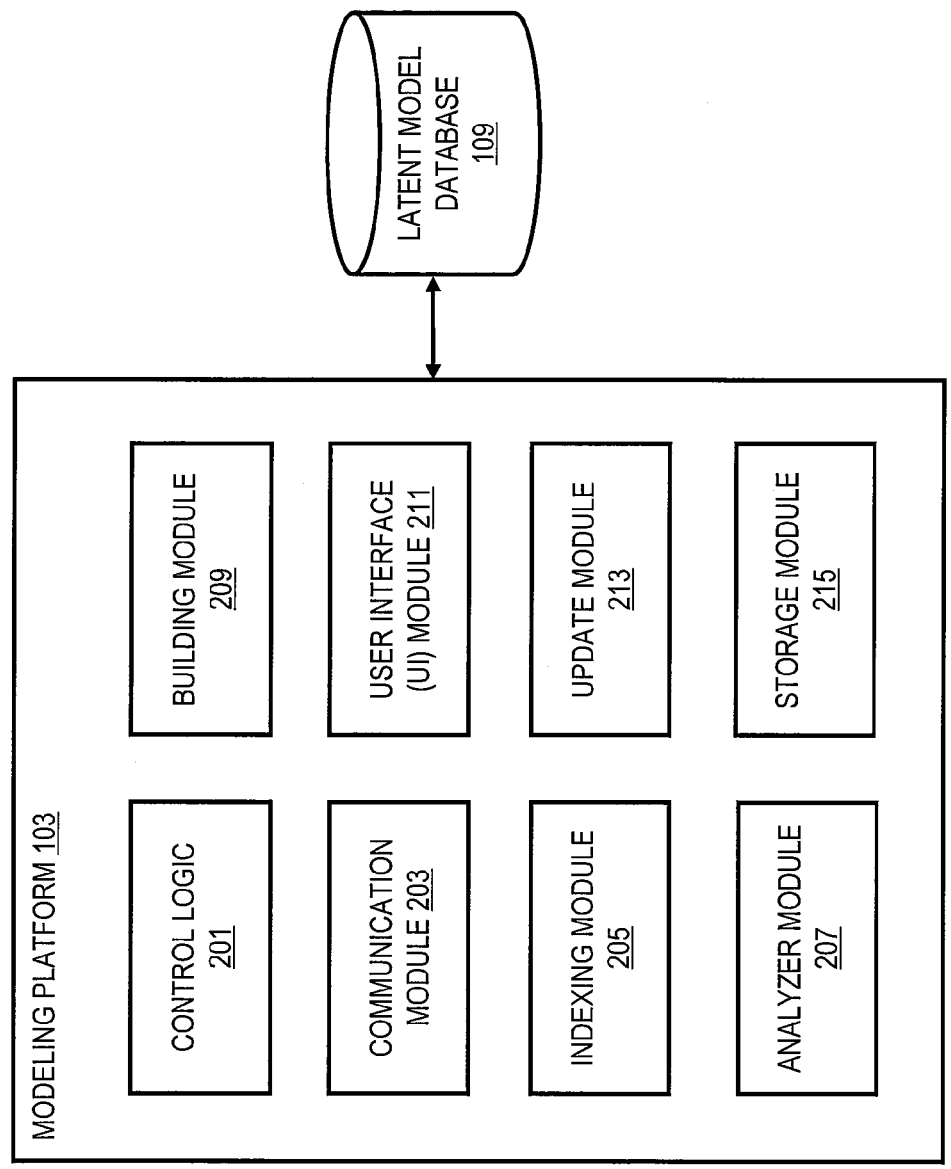
FIG. 2 is a diagram of the components of a modeling platform, according to one embodiment.

FIG. 2 is a diagram of the components of a modeling platform 103, according to one embodiment. By way of example, the modeling platform 103 includes one or more components for constructing dynamic latent models that determine consumer/social network intrinsic properties and automatically recommend user interactions with different social networks. It is contemplated that the functions of these components may be combined in one or more components or performed by other components of equivalent functionality. In this embodiment, the modeling platform 103 includes a control logic 201, a communication module 203, an indexing module 205, an analyzer module 207, a building module 209, a user interface (UI) module 211, an update module 213, and a storage module 215.

The control logic 201 oversees tasks, including tasks performed by the communication module 203, the indexing module 205, the analyzer module 207, the building module 209, the UI module 211, the update module 213, and the storage module 215. For example, although the other modules may perform the actual task, the control logic 201 may determine when and how those tasks are performed or otherwise direct the other modules to perform the task.

The communication module 203 is used for communication between the UE 101, the modeling platform 103, the applications 107, the latent model database 109, the services platform 111, the services 113, the content providers 115, and the satellites 117. The communication module 203 may also be used to communicate commands, requests, data, etc. The communication module 203, in connection with the UI module 211, may also be used to cause, at least in part, a presentation of a recommendation to interact with the one or more social networks, the one or more other social networks, or a combination thereof based, at least in part, on the one or more latent models.

In one embodiment, the indexing module 205 is used to determine one or more social networks associated with one or more users, one or more devise associated with the one or more users (e.g., a mobile phone or a tablet), or a combination thereof. In particular, the one or more social networks may include, at least in part, one or more social networking services, one or more blogging services, one or more mass messaging services, etc. The indexing module 205 may also be used to determine one or more credentials associated with the one or more users for the one or more social networks. The indexing module 205 also may be used to determine one or more other latent models from the one or more social networks, the one or more other social networks, or a combination thereof.

The analyzer module 207 is used to determine a quorum of the one or more credentials, the one or more network profiles, or a combination thereof (e.g., a quorum of 10 users). However, it is contemplated that the modeling platform 103 will function more effectively when the modeling platform 103 has access to thousands of the one or more credentials, the one or more network profiles, or a combination thereof. The analyzer module 207 may also be used to process and/or facilitate a processing of the one or more credentials, the one or more network profiles, or a combination thereof to determine content associated with the one or more users. By way of example, the analyzer module 207 can determine one or more user posts, one or more posts by friends available to the user, one or more group posts available to the user, etc., including textual and/or multimedia content. The analyzer module 207 also may be used to determine one or more hierarchical levels of description for the one or more social networks, the one or more other social networks, or a combination thereof. In particular, the analyzer module 207 can determine the formal attributes of the one or more social networks (i.e., what the network is about) and then organize, for example, the one or more levels of the one or more social networks as follows: general social network>topic lists>subtopic lists>group descriptions>user descriptions, etc. The analyzer module 207 may also be used to determine additional content associated with the one or more users, the one or more social networks, or a combination thereof. For example, one or more users may post new information or content throughout a day to one or more social networks or a user may start a new thread based, at least in part, on one or more previous discussions. Further, the analyzer module 207 may be used to determine one or more preloaded latent models on the one or more devices (e.g., a mobile phone or a tablet).

In one embodiment, the building module 209 is used to process and/or facilitate a processing of data associated with the one or more social networks to generate the one or more latent models describing the one or more social networks. For example, the one or more latent models generated by the building module 209 can describe the one or more social networks in terms of content type, titles, and categories as well as types of users, etc. More specifically, at a minimum, the one or more latent models include, at least in part, at least one topic list, at least one index, or a combination thereof associated with the one or more hierarchical levels. Moreover, the building module 209 generates the one or more latent models based, at least in part, on one or more sets of latent vectors. The building module 209 may also be used to cause, at least in part, a generation of the one or more latent models based, at least in part, on the one or more hierarchical levels. Further, the building module 209 also may be used to cause, at least in part, the generation of the one or more latent models based, at least in part, on the quorum.

As previously discussed, the user interface (UI) module 211 is used, in connection with the communication module 203, to cause, at least in part, a presentation of a recommendation to interact with the one or more social networks, the one or more other social networks, or a combination thereof based, at least in part, on the one or more latent models. The UI module 211 may also be used to determine at least one interaction with one or more applications rendering content on the one or more devices. By way of example, the one or more applications may include, at least in part, a web browser, a word processing program, etc., and the one or more interactions may include, at least in part, one or more physical inputs (e.g., typing on a virtual keyboard), one or more audio inputs (e.g., voice recognition), one or more gestural inputs (e.g., a swiping motion), or a combination thereof.

In one embodiment, the update module 213 is used to cause, at least in pall, one or more updates of the one or more corresponding latent models based, at least in part, on the additional content (e.g., a new post, a new discussion thread, etc.). More specifically, the update module 213 ensures that the one or more latent models are up-to-date with all available descriptive information so that the one or more latent model topics are recent and the one or more social network descriptions are accurate (i.e., the one or more latent models are dynamic). The update module 213 may also be used to cause, at least in part, at least one modification of the one or more preloaded latent models based, at least in part, on the one or more credentials, the one or more network profiles, or a combination thereof, wherein the at least one modification occurs periodically, according to a schedule, on demand, or a combination thereof. By way of example, the update module 213 may determine that the one or more preloaded latent modules do not comport with the one or more network profiles associated with a user and, therefore, cause, at least in part, the particular one or more latent models to be discarded. Alternatively, the update module 213, in connection with the communication module 203 and the analyzer module 207, may request one or more other latent modules (e.g., from the latent module database 109, the services 113, the content providers 115, etc.) and then recommend to the one or more users adding the one or more other latent models to the one or more devices.

The storage module 215 is used to manage the storage of the list of the one or more social networks associated with the one or more users, the one or more devices associated with the one or more users, or a combination thereof stored in the latent model database 109. In addition, the storage module 215 may be used to manage the storage of the list of the one or more other social networks as well as the one or more credentials, the one or more network profiles, or a combination thereof associated with the one or more users stored in the latent model database 109. Further, the storage module 215 also may be used to manage the storage of the one or more other latent models from the one or more social networks, the one or more other social networks, or a combination thereof also stored in the latent model database 109.

Figure 3:
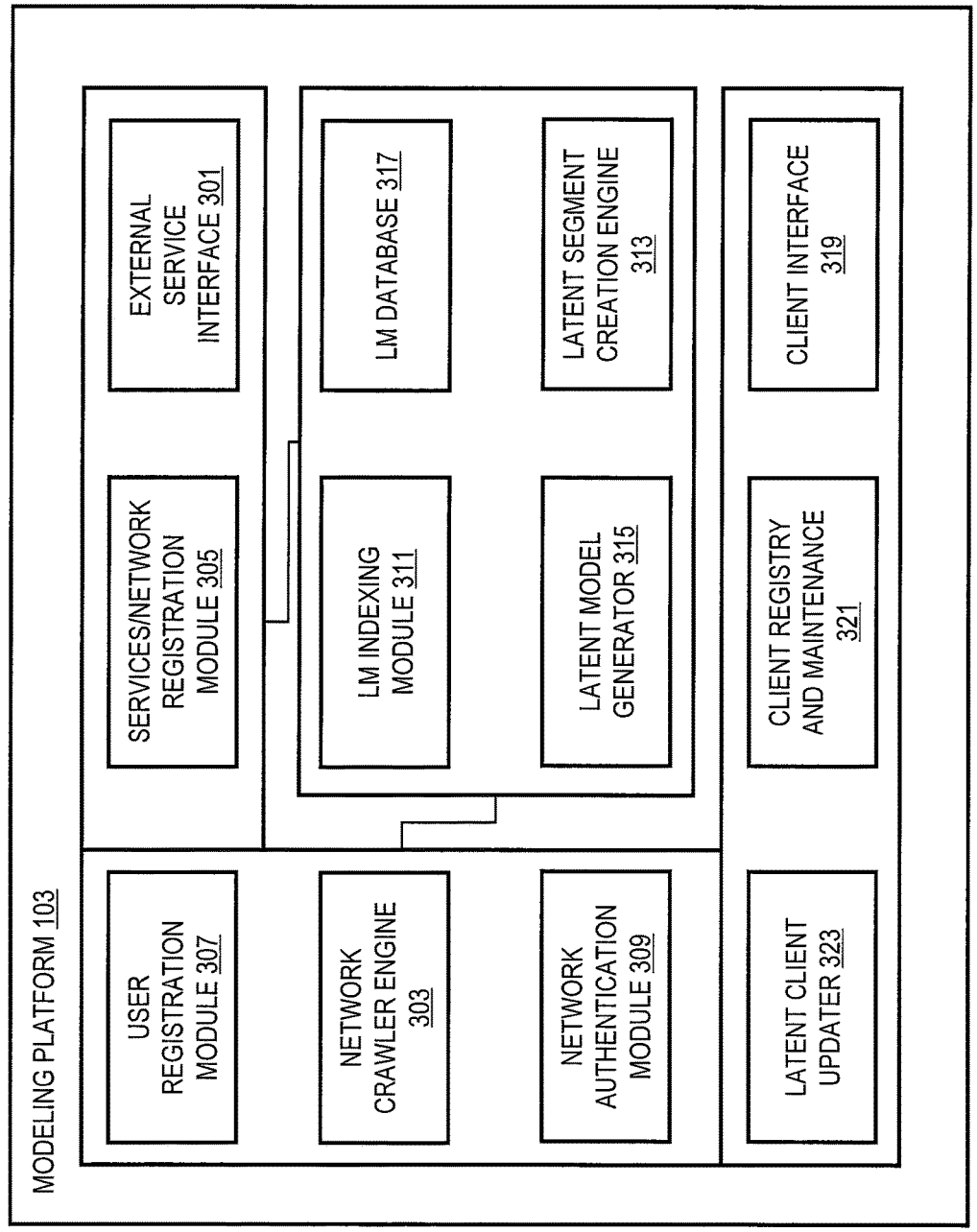
FIG. 3 is also a diagram of the components of a modeling platform, according to one embodiment.

FIG. 3 is also a diagram of the components of a modeling platform 103, according to one embodiment. By way of example, the modeling platform 103 includes one or more components for constructing dynamic latent models that determine consumer/social network intrinsic properties and automatically recommend user interactions with different social networks. It is contemplated that the functions of these components may be combined in one or more components or performed by other components of equivalent functionality. In this embodiment, the modeling platform 103 includes an external service interface 301, a network crawler engine 303, a services/network registration module 305, a user registration module 307, a network authentication module 309, a latent module (LM) indexing module 311, a latent segment creation engine 313, a latent model generator 315, an LM database 317, a client interface 319, a client registry and maintenance 321, and a latent client updater 323.

In one embodiment, the external service interface 301, in connection with the network crawler engine 303 and the services/network registration module 305, first determine one or more social networks associated with the one or more users, the one or more devices (e.g., a mobile device or a tablet), or a combination thereof. The user registration module 307, in connection with the network authentication module 309, next determines one or more credentials, one or more network profiles, or a combination thereof associated with the one or more users for the one or more social networks. More specifically, the one or more credentials may include, at least in part, a login, a username, a password, etc., and the one or more network profiles may include, at least in part, a user profile, user interest information, or a combination thereof. The user registration module 307, in connection with the network authentication module 309, may also be used to process and/or facilitate a processing of the one or more credentials, the one or more network profiles, or a combination thereof to determine content associated with the one or more users.

In one or more embodiments, the LM indexing module 311, in connection with the latent segment creation engine 313, then determines one hierarchical levels of description for the one or more social networks, the one or more other social networks, or a combination thereof. In particular, the LM indexing module 311 can determine the formal attributes of the one or more levels of the one or more social networks and then organize, for example, the one or more social networks as follows: general social network>topic lists>subtopic lists>group descriptions>user descriptions, etc. Moreover, the latent segment creation engine 313, for example, may determine that there are may be one or more fine-grained discussions or topics (e.g., surgery under medical services) within a particular social network.

In one embodiment, the latent model generator 315 next processes and/or facilitates a process of data associated with the one or more social networks to generate one or more latent models describing the one or more social networks. In addition, the one or more latent models generated by the latent model generator may be stored in the LM database 317. In one or more embodiments, the latent model generator 315 causes, at least in part, the generation of the one or more latent models based, at least in pall, on the one or more hierarchical levels. The latent model generator 315 can also cause, at least in part, the generation of the one or more latent models based, at least in part, on the quorum.

In one or more embodiments, the client interface 319, in connection with the client registry and maintenance 321, causes, at least in part, a presentation of a recommendation to a user in substantially real-time, for example, to interact with the one or more social networks, the one or more other social networks, or a combination thereof based, at least in part, on the one or more latent models. By way of example, the client interface 319 and the client registry and maintenance 32 lean recommend where to post certain content to get the maximum number of reads or target specific users or the client interface 319, in connection with the network crawler engine 303, can recommend one or more other social networks to join based, at least in part, on the type of content a user wants to post or utilize. The client interface 319, in connection with the client registry and maintenance 321, also may be used to determine at least one interaction with one or more applications rendering content on the one or more devices. As previously discussed, the client interface 319 may determine the one or more interactions based, at least in part, on one or more physical inputs (e.g., typing on a virtual keyboard), one or more audio inputs (e.g., voice recognition), one or more gestural inputs (e.g., a swiping motion), or a combination thereof.

In one or more embodiments, the latent client updater 323, in connection with the network authentication module 309, determines additional content associated with the one or more users, the one or more social networks, or a combination thereof. In one embodiment, the latent client updater 323 then causes, at least in part, one or more updates of the one or more corresponding latent models based, at least in part, on the additional content. Again, the one or more updated latent models may be stored in the LM database 317.

Figure 4:
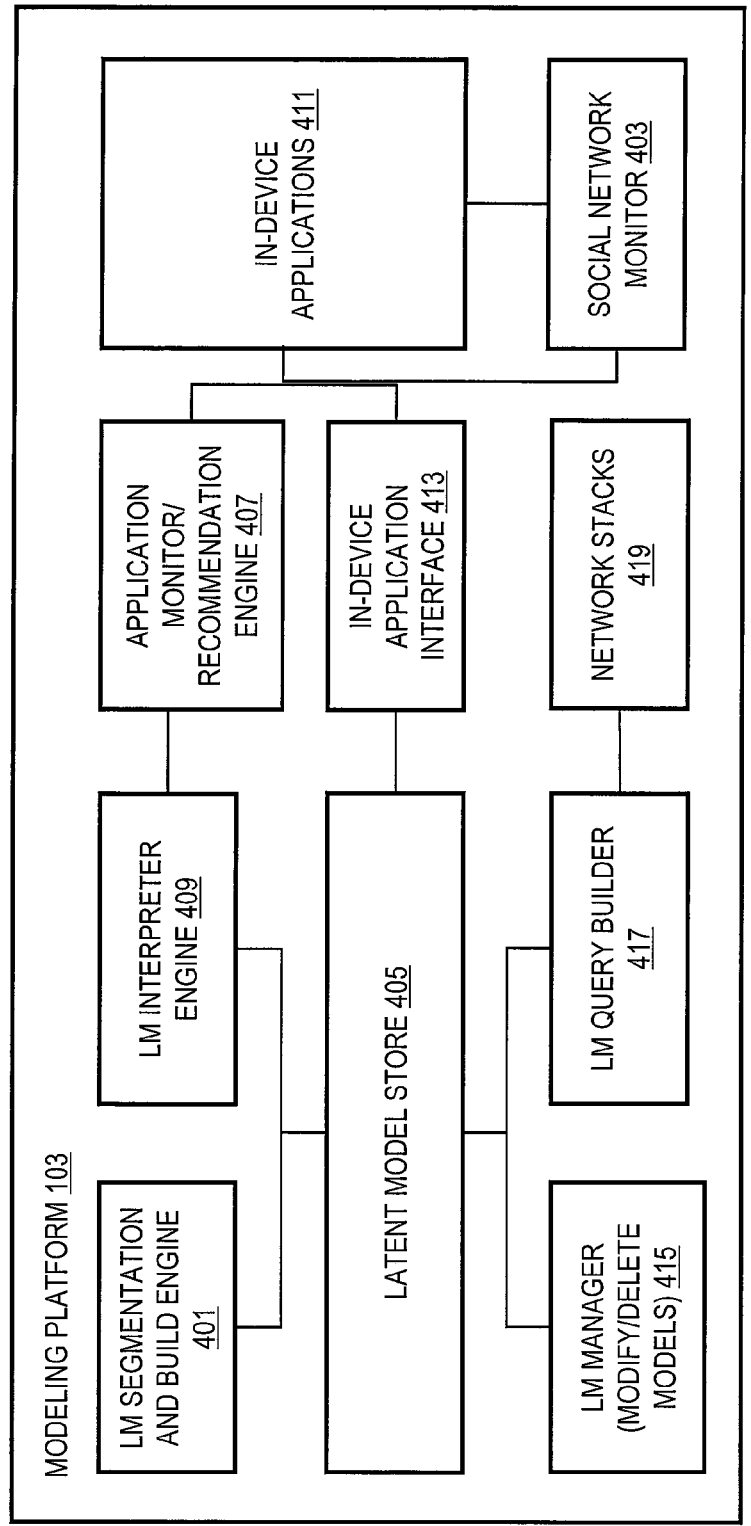
FIG. 4 is a diagram of the components of a client-side modeling platform, according to one embodiment.

FIG. 4 is a diagram of the components of a client-side modeling platform 103, according to one embodiment. By way of example, the modeling platform 103 includes one or more components for constructing dynamic latent models that determine consumer/social network intrinsic properties and automatically recommend user interactions with different social networks. It is contemplated that the functions of these components may be combined in one or more components or performed by other components of equivalent functionality. In this embodiment, the client-side modeling platform 103 includes an LM segmentation and build engine 401, a social network monitor 403, a latent model store 405, an application monitor/recommendation engine 407, an LM interpreter engine 409, in-device applications 411, an in-device application interface 413, an LM manager 415, an LM query builder 417, network stacks 419.

In one embodiment, the LM segmentation and build engine 401, in connection with the social network monitor 403, processes and/or facilitates a processing of data associated with the one or more social networks to generate one or more latent models describing the one or more social networks. As previously discussed, the data can include information about the one or more social networks (e.g., formal attributes) as well as textual and/or multimedia content posted by one or more users associated with the one or more social networks. Once the one or more latent models are generated by the LM segmentation and build engine 401, the one or more latent models may be stored in the latent model store 405.

In one or more embodiments, the application monitor/recommendation engine 407, in connection with the LM interpreter engine 409, next causes, at least in part, a presentation of a recommendation to a user in substantially real-time, for example, to interact with the one or more social networks, the one or more other social networks, or a combination thereof based, at least in part, on the one or more latent models stored in the latent model store 405. By way of example, the application monitor/recommendation engine 407, in connection with the LM interpreter engine 409, can recommend to a user one or more social networks to post data to, one or more other social networks to discover or suggest to a user one or more social networks based on the type of data that the user may want to post or utilize. In certain embodiments, the client-side modeling platform 103 may employ a semantic interpreter (not shown for illustrative purposes) in order for the application monitor/recommendation engine 407 to understand user or application data (e.g., data from the in-device applications 411).

In one embodiment, once the LM segmentation and build engine 401 generates the one or more latent models, the in-device application interface 413 can determine at least one interaction with the one or more in-device applications 411 rendering the content on the one or more devices (e.g., a web browser, a word processing program, etc.), wherein the recommendation from the application monitor/recommendation engine 407 is further based, at least in part, on the at least one interaction. In one example use case, if the application monitor/recommendation engine 407 determines that a user is reading something on a device (e.g., travel information about the fjords of Norway), then the application monitor/recommendation engine 407 can recommend that the user follow a particular discussion on the relevant one or more social networks, one or more other social networks, or a combination thereof.

In one or more embodiments, the LM manager 415, in connection with the social network monitor 403, can determine additional content associated with the one or more users, the one or more social networks, or a combination thereof. In one embodiment, the LM manager 415 then causes, at least in part, one or more updates of the one or more corresponding latent models stored in the latent model store 405 based, at least in part, on the additional content. In certain embodiments, the LM model manager 415 determines one or more preloaded latent models on the one or more devices.

In one or more embodiments, once the one or more network preferences of the one or more users become clearer to the application monitor/recommendation engine 407, for example, the LM model manager 415 can cause, at least in part, at least one modification of the one or more preloaded latent models based, at least in part, on the one or more credentials, the one or more network profiles, or a combination thereof associated with the one or more users. By way of example, the LM manager 415 may determine that the one or more preloaded latent models (e.g., relating to shopping) do not comport with the one or more network profiles associated with a user and, therefore, the LM manager 415 can cause, at least in part, the one particular one or more preloaded latent models to be discarded. In one embodiment, the LM query builder 417, in connection with the social network monitor 403, determines one or more other latent models from the one or more social networks, the one or more other social networks, or a combination thereof, wherein the at least one modification includes, at least in part, an addition of the one or more other latent models to the one or more devices. Again, once the one or more network preferences of the one or more users become clearer to the application monitor/recommendation engine 407, for example, the LM query builder 417 may request one or more other latent models from the network stacks 419 and then recommend to the one or more users adding the one or more other latent models to the one or more devices.

Figure 5:
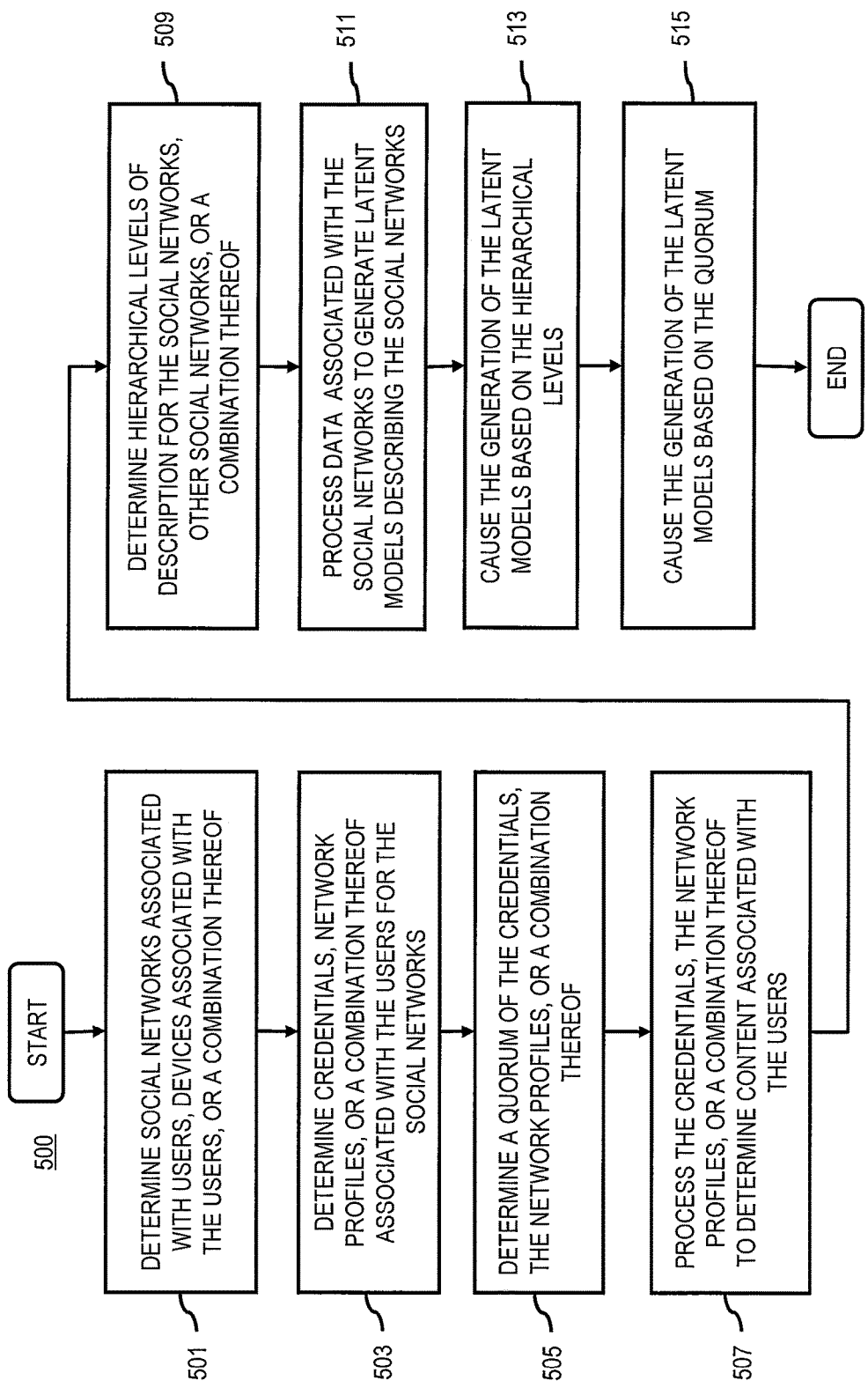
FIGS. 5 and 6 are flowcharts of processes for constructing dynamic latent models that determine consumer/social network intrinsic properties and automatically recommend user interactions with different social networks, according to one embodiment.
Figure 6:
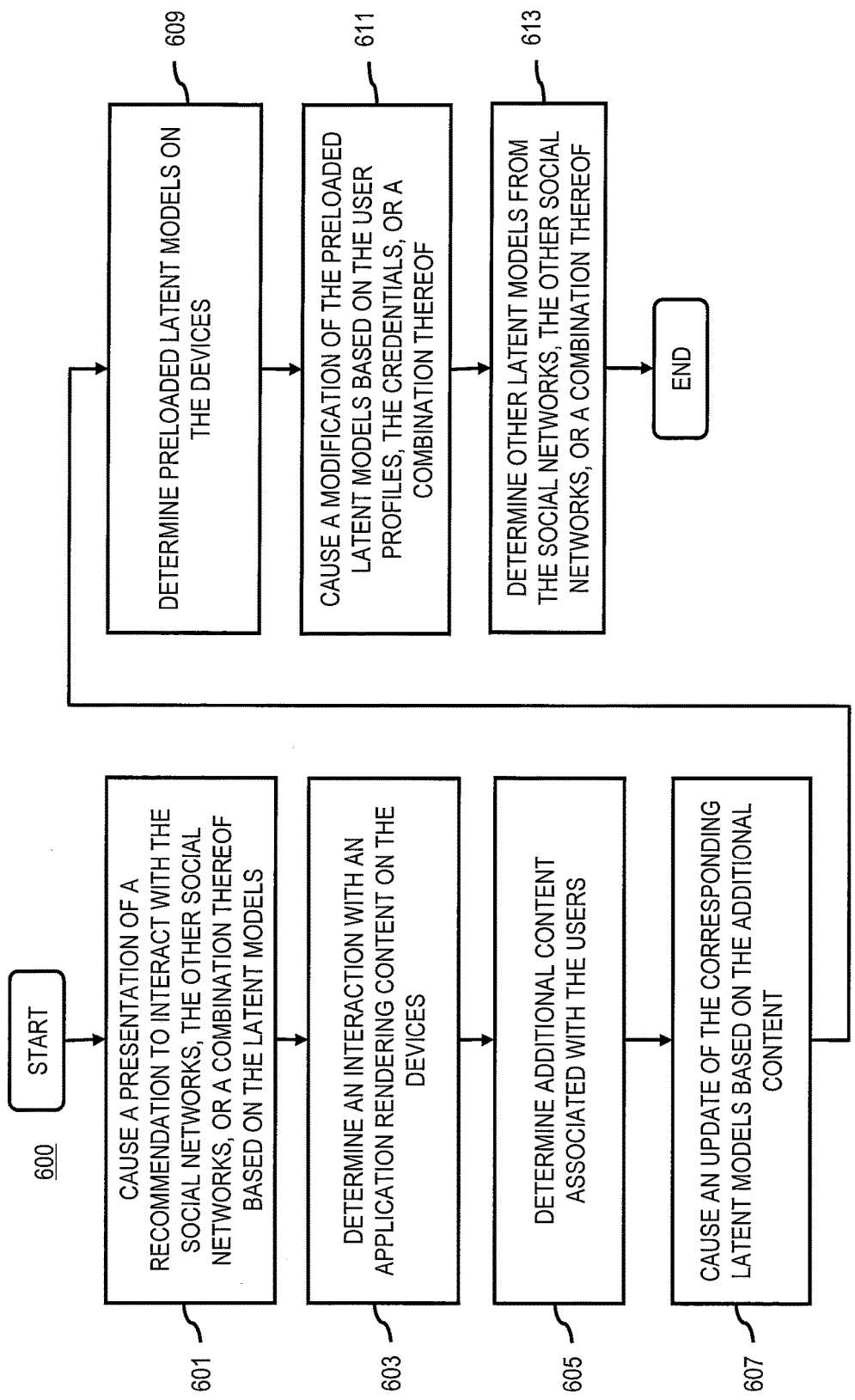
Figure 9:
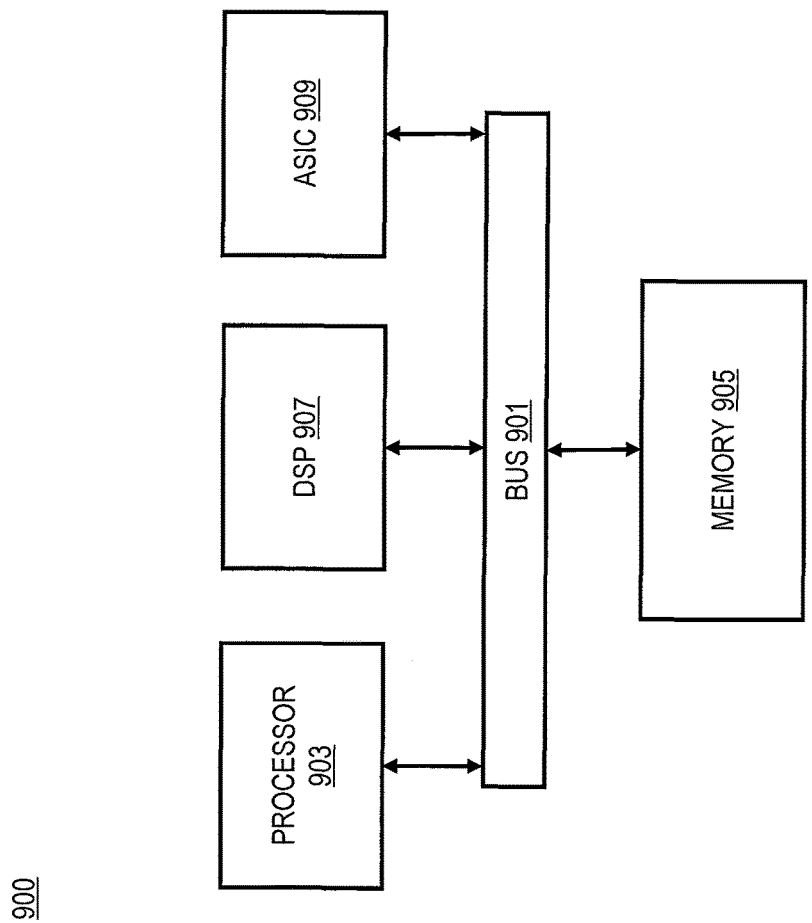
FIG. 9 is a diagram of a chip set that can be used to implement an embodiment of the invention.

FIGS. 5 and 6 are flowcharts of processes for constructing dynamic latent models that determine consumer/social network intrinsic properties and automatically recommend user interactions with different social networks, according to one embodiment. FIG. 5 depicts a process 500 of generating one or more latent models. In one embodiment, the modeling platform 103 performs the process 500 and is implemented in, for instance, a chip set including a processor and a memory as shown in FIG. 9. In step 501, the modeling platform 103 determines one or more social networks associated with one or more users, one or more devices associated with the one or more users, or a combination thereof. By way of example, the one or more social networks include, at least in part, one or more social networking services, one or more blogging services, one or more mass messaging services, a contact list, a school or work network, etc. In one example use case, the determination of the one or more social networks may be based, at least in part, on a user logging into the modeling platform 103 and selecting one or more social networks that he or she is associated with.

In step 503, the modeling platform 103 determines one or more credentials, one or more network profiles, or a combination thereof associated with the one or more users for the one or more social networks. More specifically, the one or more credentials may include, at least in part, a login, a username, a password, etc. and the one or more network profiles may include, at least in part, a user profile, user interest information, or a combination thereof. Then, in step 505, the modeling platform 103 determines a quorum of the one or more credentials, the one or more network profiles, or a combination thereof. By way of example, once the modeling platform 103 determines a quorum (e.g., a quorum of 10 users), the modeling platform 103 can start analyzing or mining the one or more corresponding social networks for available data (i.e., data specific to the one or more users that have provided credentials and given the limitations on access to data placed by the one or more corresponding social networks). However, it is contemplated that the modeling platform 103 will function more effectively when the modeling platform 103 has access to thousands of the one or more credentials, the one or more network profiles, or a combination thereof.

In step 507, the modeling platform 103 processes and/or facilitates a processing of the one or more credentials, the one or more network profiles, or a combination thereof to determine content associated with the one or more users, wherein the data associated with the one or more social networks includes, at least in part, the content. In particular, the modeling platform 103 can determine one or more user posts, one or more posts by friends available to the user, one or more group posts available to the user, etc., including textual and/or multimedia content. In addition, the modeling platform 103 may also determine that one or more users recently viewed content associated with one or more social networks (e.g., on a personal homepage).

In step 509, the modeling platform 103 determines one or more hierarchical levels of description for the one or more social networks, the one or more other social networks, or a combination thereof. More specifically, the one or more social networks are one or more social networks that the user is currently associated with and the one or more other social networks include, at least in part, one or more social networks that the user may not belong to, but may have limited access to. Moreover, the modeling platform 103 can determine the formal attributes of the one or more social networks and then organize, for example, the one or more levels of the one or more social networks as follows: general social network>topic lists>subtopic lists>group descriptions>user descriptions, etc. For example, the modeling platform 103 can determine that on a particular social network (e.g., a social networking service) one or more users associated with that social network have posted information (e.g., in a discussion) under the heading "technology" and that within that discussion there may be one or more fine-grained discussions.

In step 511, the modeling platform 103 processes and/or facilitates a processing of data associated with the one or more social networks to generate one or more latent models describing the one or more social networks. By way of example, the data can include information about the one or more social networks (e.g., formal attributes) as well textual and/or multimedia content posted by the one or more users associated with the one or more social networks. Moreover, the one or more latent models generated by the modeling platform 103 can describe the one or more social networks in terms of content type, titles, and categories as well as types of users, etc. At a minimum, the one or more latent models include, at least in part, at least one topic list, at least one index, or a combination thereof associated with the one or more hierarchical levels. Further, the modeling platform 103 generates the one or more latent models based, at least in part, on one or more sets of latent vectors (i.e., they have no inherent meaning).

In step 513, the modeling platform 103 causes, at least in part, the generation of the one or more latent models based, at least in part, on the one or more hierarchical levels, wherein the one or more hierarchical levels are based, at least in part, on the data associated with the one or more social networks, the content, or a combination thereof. In particular, the one or more latent models describe each hierarchical level of the one or more social networks. For example, the one or more latent models may be complimentarily organized by the modeling platform 103 as follows: general latent model>a topic list latent model>a subtopic list latent model>a group description latent model>user latent models, etc. Further, the modeling platform 103 can cause, at least in part, an association between each topic of the one or more social networks and at least one index, wherein each subtopic list latent model, each group description latent model, and so forth would also be associated with and point to the index.

In step 515, the modeling platform 103 causes, at least in part, the generation of the one or more latent models based, at least in part, on the quorum. For example, when the modeling platform 103 determines a quorum of the one or more users (i.e., a quorum of latent signatures or latent vectors), the modeling platform 103 can determine the common data among all of the one or more users or among a subset of the of the one or more users resulting in common latent data that the modeling platform 103 can then extract and use to describe the one or more corresponding social networks in latent terms. However, the modeling platform 103 may be provided access to other data as well by the one or more social networks and the data that the modeling platform 103 processes is only limited by the level of access to that data that the one or more social networks provide to the modeling platform 103.

FIG. 6 depicts a process 600 of causing, at least in part, one or more interactions with one or more social networks. In one embodiment, the modeling platform 103 performs the process 600 and is implemented in, for instance, a chip set including a processor and a memory as shown in FIG. 9. In step 601, the modeling platform 103 causes, at least in part, a presentation of a recommendation to interact with the one or more social networks, one or more other social networks, or a combination thereof based, at least in part, on the one or more latent models. By way of example, the modeling platform 103 can recommend to a user in substantially real-time, for example, where to post certain content to get the maximum number of reads or target specific users or the modeling platform 103 can recommend to a user one or more other social networks to join based, at least in part, on the type of content the user wants to post or utilize. In one example use case, if the modeling platform 103 knows the type of content and/or the one or more users that a user has previously shared similar content (e.g., vacation photographs), then the modeling platform 103 can recommend one or more interactions with one or more relevant social networks (e.g., a photography discussion, friends and family, etc.). Further, in one or more embodiments, based on the one or more credentials, the one or more network profiles, or a combination thereof, the modeling platform 103 can automatically initiate the recommended interaction with the one or more social networks.

In step 603, the modeling platform 103 determines at least one interaction with one or more applications rendering content on the one or more devices, wherein the recommendation is further based, at least in part, on the at least one interaction. By way of example, the one or more applications may include a web browser, a word processing program, etc. and the at least one interaction may include reading content on one or more social networks (e.g., a social networking service), writing or posting content on one or more social networks, or a combination thereof. In one example use case, if the modeling platform 103 determines that a user is reading something on a device (e.g., travel information about the fjords of Norway), then the modeling platform 103 can recommend that the user follow a particular discussion on the relevant one or more social networks, one or more other social networks, or a combination thereof. Similarly, in another example use case, if the modeling platform 103 determines that a user is writing content on a blog, on a social networking service (e.g., a personal homepage), or a combination thereof, the modeling platform 103 can recommend to the user relevant one or more social networks, one or more other social networks, or a combination thereof to post the material. As previously discussed, it is contemplated that the one or more applications running on one or more devices provide the one or more devices access to the relevant application data and provide the one or more devices with respective interfaces through which the modeling platform 103 can provide one or more recommendations. Thereafter, one or more applications can determine specifically how the one or more recommendations are rendered to the user.

In step 605, the modeling platform 103 determines additional content associated with the one or more users, the one or more social networks, or a combination thereof. By way of example, one or more users may post new information or content throughout a day to one or more social networks or a user may start a new thread based on one or more previous discussions. Then in step 607, the modeling platform 103 causes, at least in part, one or more updates of the one or more corresponding latent models based, at least in part, on the additional content. In particular, one or more subsets of latent models on a local device (e.g., a mobile phone or a tablet) can also be updated by the modeling platform 103 based, at least in part, on user interaction from a larger latent model (e.g., a general latent model) on a network server, for example. As a result, the modeling platform 103 ensures that the one or more latent models are up-to-date with all of the available descriptive information so that the one or more latent model topics are recent and the one or more social network descriptions are accurate (i.e., the one or more latent models are dynamic).

In step 609, the modeling platform 103 determines one or more preloaded latent models on the one or more devices. In particular, the one or more preloaded latent models are a subset of the one or more general latent models generated or acquired by the modeling platform 103 and may include, at least in part, generic topics such as shopping, technology, sports, news, entertainment, etc. Then in step 611, once the one or more network preferences of the one or more users become clearer to the modeling platform 103 (e.g., over some period of time), the modeling platform 103 causes, at least in part, at least one modification of the one or more preloaded latent models based, at least in part, on the one or more credentials, the one or more network profiles, or a combination thereof, wherein the at least one modification occurs periodically, according to a schedule, on demand, or a combination thereof. By way of example, the modeling platform 103 may determine that the one or more preloaded latent models (e.g., relating to shopping) do not comport with one or more network profiles associated with a user and, therefore, cause, at least in part, the particular one or more preloaded latent models to be discarded by the modeling platform 103, the device, or a combination thereof.

In step 613, the modeling platform 103 determines one or more other latent models from the one or more social networks, the one or more other social networks, or a combination thereof, wherein the at least one modification includes, at least in part, an addition of the one or more other latent models to the one or more devices. By way of example, once the one or more network preferences of the one or more users become clearer to the modeling platform 103, the modeling platform 103 may request one or more other latent models (e.g., from a database, a third-party, etc.) and then recommend to the one or more users adding the one or more other latent models to the one or more devices.

Figure 7:
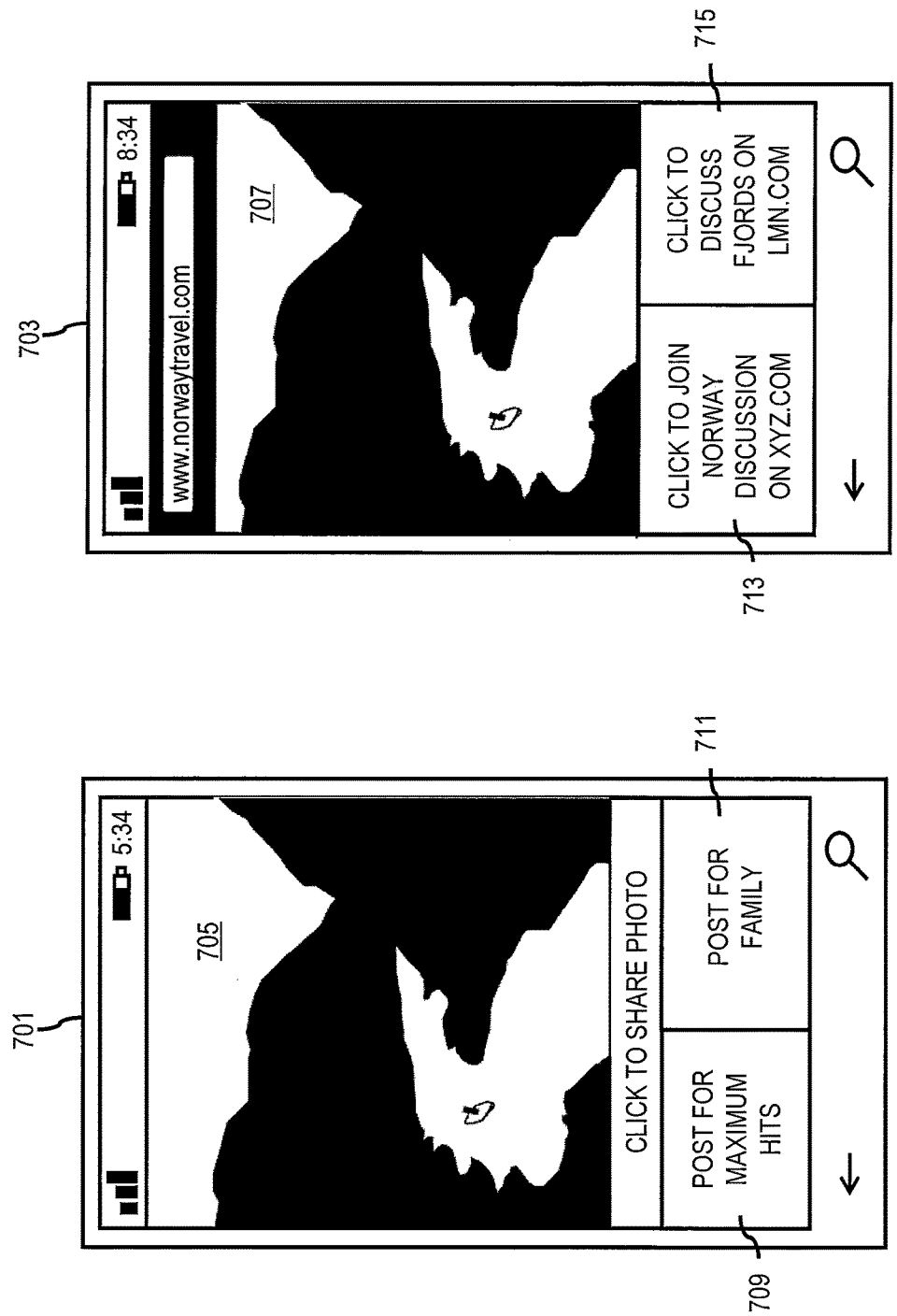
FIG. 7 is a diagram of user interfaces utilized in the processes of FIGS. 5 and 6, according to various embodiments.

FIG. 7 is a diagram of user interfaces utilized in process of FIGS. 5 and 6, according to various embodiments. As shown, the example user interfaces of FIG. 7 include one or more user interface elements and/or functionalities created and/or modified based, at least in part, on the information, data, and/or signals resulting from the processes (e.g., processes 500 and 600) described with respect to FIGS. 5 and 6. More specifically, FIG. 7 illustrates two user interfaces (e.g., interfaces 701 and 703) depicting the presentation of one or more recommendations in substantially real-time, for example, to interact with the one or more social networks based, at least in part, on the one or more latent models.

In one embodiment, once the system 100 generates the one or more latent models, the system 100 can determine at least one interaction with one or more applications rending content on the one or more devices (e.g., a camera application 705 or a web browser 707), wherein the recommendation is further based, at least in part, on the at least one interaction. By way of example, if the system 100 determines in interface 701 that a user has just taken a photograph (e.g., of a fjord in Norway), the system 100 can recommend to the user one or more relevant social networks, one or more relevant other social networks, or a combination thereof to post the material. More specifically, the system 100 can recommend to the user where to post the photograph to get the maximum reads or hits (e.g., by selecting button 709) or target specific users (e.g., "post for family" as depicted by button 711). In addition, the system 100 can recommend to the user one or more social networks to join based, at least in part, on the type of content the user wants to post or utilize. In the other example use case, the system 100 determines that a user is using the web browser 707 of interface 703 to reading information about Norway as depicted by the website "www.norwaytravel.com." Consequently, the system 100 can recommend to the user that he or she follow a particular discussion (e.g., a general discussion on Norway as depicted by button 713) on the relevant one or more social networks (e.g., "XYZ.COM"), one or more other social networks, or a combination thereof. In addition to recommending a general discussion, based on the hierarchical organization of the underlying latent models, the system 100 can also determine and recommend to the user one or more fine-grained discussions (e.g., a specific discussion about fjords on "LMN.COM" as depicted by button 715). Moreover, as previously mentioned, based on the one or more credentials, the one or more network profiles, or a combination thereof, the system 100 can automatically initiate the recommended interaction with the one or more social networks (e.g., "post for family" as depicted by button 711)

The processes described herein for constructing dynamic latent models that determine consumer/social network intrinsic properties and automatically recommend user interactions with different social networks may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
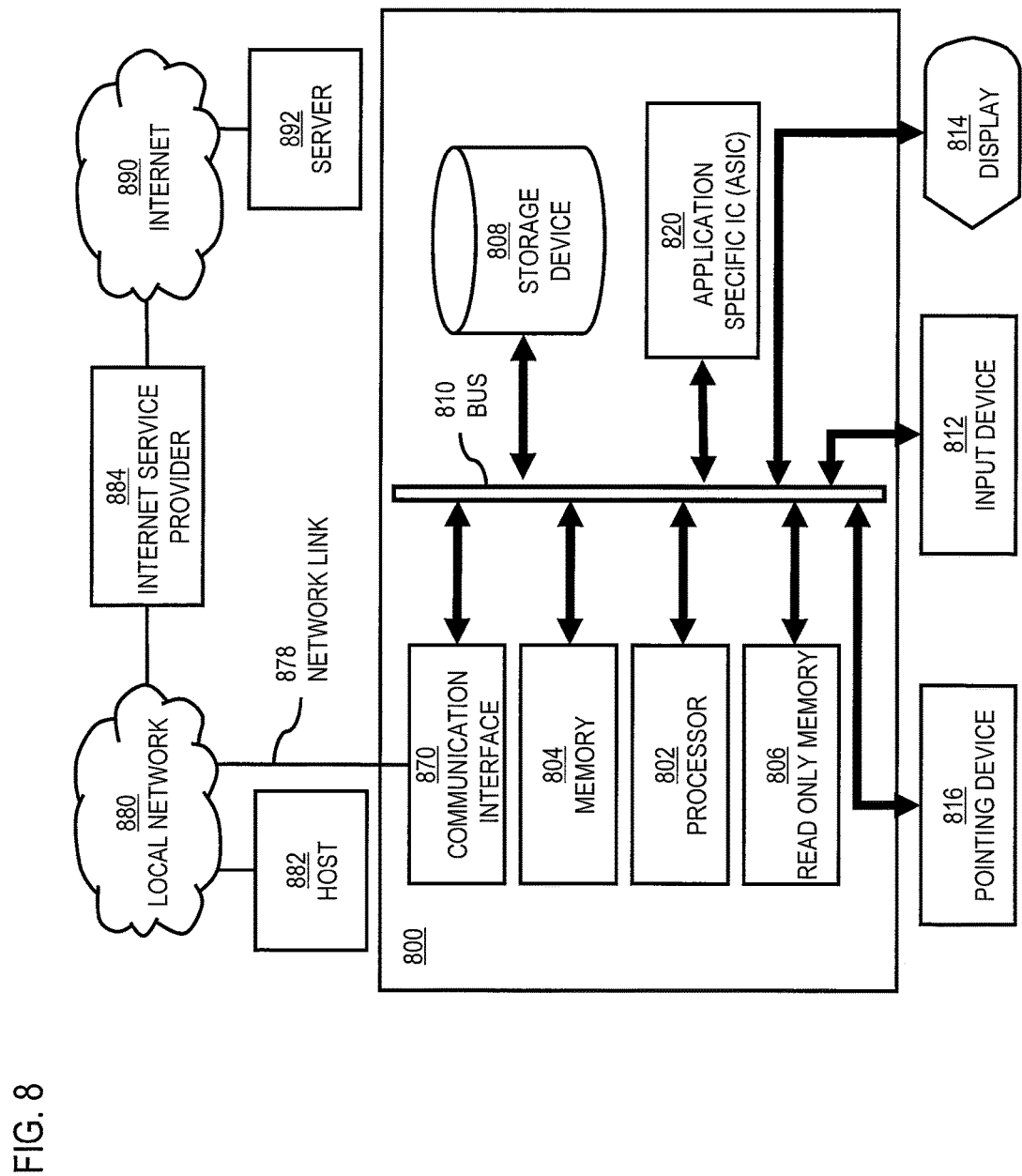
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to construct dynamic latent models that determine consumer/social network intrinsic properties and automatically recommend user interactions with different social networks as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of constructing dynamic latent models that determine consumer/social network intrinsic properties and automatically recommend user interactions with different social networks.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to construct dynamic latent models that determine consumer/social network intrinsic properties and automatically recommend user interactions with different social networks. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or any other dynamic storage device, stores information including processor instructions for constructing dynamic latent models that determine consumer/social network intrinsic properties and automatically recommend user interactions with different social networks. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for constructing dynamic latent models that determine consumer/social network intrinsic properties and automatically recommend user interactions with different social networks, is provided to the bus 810 for use by the processor from an external input device 812, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 105 for constructing dynamic latent models that determine consumer/social network intrinsic properties and automatically recommend user interactions with different social networks to the UE 101.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed to construct dynamic latent models that determine consumer/social network intrinsic properties and automatically recommend user interactions with different social networks as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of constructing dynamic latent models that determine consumer/social network intrinsic properties and automatically recommend user interactions with different social networks.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to construct dynamic latent models that determine consumer/social network intrinsic properties and automatically recommend user interactions with different social networks. The memory 905 also stores the data associated with or generated by the execution of the inventive steps.

Figure 10:
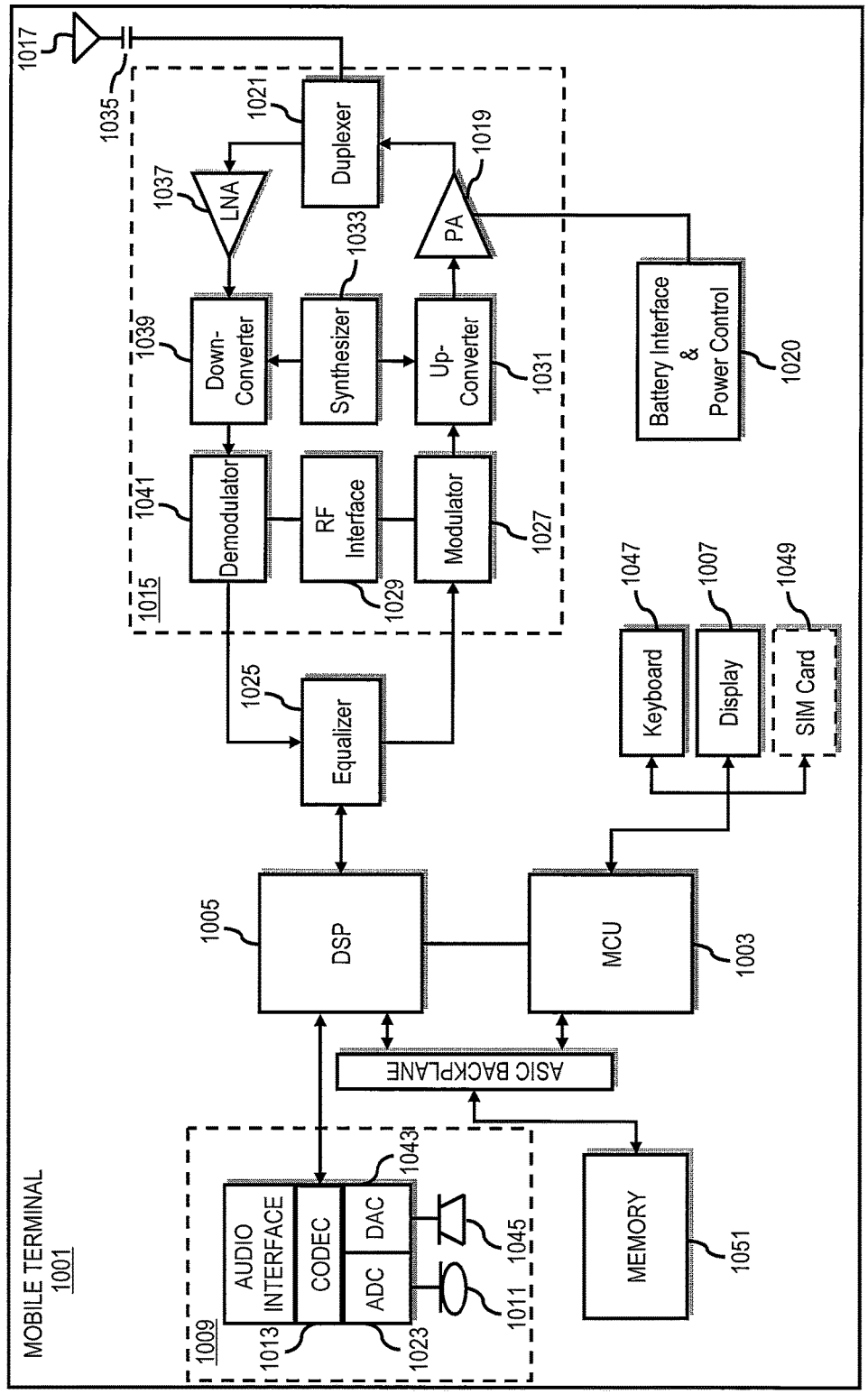
FIG. 10 is a diagram of a mobile terminal (e.g., handset) that can be used to implement an embodiment of the invention.

FIG. 10 is a diagram of exemplary components of a mobile terminal (e.g., handset) for communications, which is capable of operating in the system of FIG. 1, according to one embodiment. In some embodiments, mobile terminal 1001, or a portion thereof, constitutes a means for performing one or more steps of constructing dynamic latent models that determine consumer/social network intrinsic properties and automatically recommend user interactions with different social networks. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of constructing dynamic latent models that determine consumer/social network intrinsic properties and automatically recommend user interactions with different social networks. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to construct dynamic latent models that determine consumer/social network intrinsic properties and automatically recommend user interactions with different social networks. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method by which a computing device recommends social networks for one or more users, the method comprising:
   determining a plurality of social networks associated with one or more users, one or more devices associated with the one or more users, or a combination thereof;
   generating one or more latent models by causing the computing device to process data associated with the plurality of social networks, the one or more latent models describing the plurality of social networks in terms of at least one of content type, content titles, content categories or types of users;
   causing a first presentation of a first user interaction recommendation to interact with a first one or more social networks of the plurality of social networks, a first one or more other social networks of the plurality of social networks, or a combination thereof based, at least in part, on the one or more latent models;
   in an instance wherein the one or more devices are determined to be associated with the one or more users, determining at least one interaction with one or more applications rendering content on the one or more devices;
   in an instance in which the content is determined to be previously shared by the one or more users, causing a second presentation of a second user interaction recommendation to interact with a second one or more social networks of the plurality of social networks, a second one or more other social networks of the plurality of social networks, or a second combination thereof based, at least in part, on the shared content; and
   in an instance in which the content is determined to be relevant to the first one or more social networks of the plurality of social networks, automatically initiating the first user interaction recommendation to interact with the first one or more social networks.

2. A method of claim 1,
   wherein the user interaction recommendation is further based, at least in part, on the at least one interaction.

3. A method of claim 1, further comprising:
   determining one or more credentials, one or more network profiles, or a combination thereof associated with the one or more users for the one or more social networks; and
   processing the one or more credentials, the one or more network profiles, or a combination thereof to determine content associated with the one or more users,
   wherein the data associated with the one or more social networks includes, at least in part, the content.

4. A method of claim 1, further comprising:
   determining one or more hierarchical levels of description for the one or more social networks, the one or more other social networks, or a combination thereof; and
   causing, at least in part, the generation of the one or more latent models based, at least in part, on the one or more hierarchical levels,
   wherein the one or more hierarchical levels are based, at least in part, on the data associated with the one or more social networks, the content, or a combination thereof.

5. A method of claim 1, further comprising:
   determining additional content associated with the one or more users, the one or more social networks, or a combination thereof; and
   causing, at least in part, one or more updates of the one or more corresponding latent models based, at least in part, on the additional content.

6. A method of claim 3, further comprising:
   determining a quorum of the one or more credentials, the one or more network profiles, or a combination thereof; and
   causing, at least in part, the generation of the one or more latent models based, at least in part, on the quorum.

7. A method of claim 3, further comprising:
   in an instance wherein the one or more devices are determined to be associated with the one or more users, determining one or more preloaded latent models on the one or more devices;
   causing, at least in part, at least one modification of the one or more preloaded latent models based, at least in part, on the one or more credentials, the one or more network profiles, or a combination thereof,
   wherein the at least one modification occurs periodically, according to a schedule, on demand, or a combination thereof.

8. A method of claim 7, further comprising:
   determining one or more other latent models from the one or more social networks, the one or more other social networks, or a combination thereof,
   wherein the at least one modification includes, at least in part, an addition of the one or more other latent models to the one or more devices.

9. A method of claim 1, wherein the one or more latent models include, at least in part, at least one topic list, at least one index, or a combination thereof associated with the one or more hierarchical levels.

10. An apparatus comprising: at least one processor; and at least one memory including computer program code for one or more programs:
    the at least one memory and the computer program code configured to, with the at least one processor, cause the apparatus to recommend social networks for one or more users by causing the apparatus to perform at least the following:
    determine a plurality of social networks associated with one or more users, one or more devices associated with the one or more users, or a combination thereof;

generate one or more latent models by processing data associated with the plurality of social networks, the one or more latent models describing the plurality of social networks in terms of at least one of content type, content titles, content categories or types of users;

cause a first presentation of a first user interaction recommendation to interact with a first one or more social networks of the plurality of social networks, a first one or more other social networks of the plurality of social networks, or a combination thereof based, at least in part, on the one or more latent models;

in an instance wherein the one or more devices are determined to be associated with the one or more users, determine at least one interaction with one or more applications rendering content on the one or more devices;

in an instance in which the content is determined to be previously shared by the one or more users, cause a second presentation of a second user interaction recommendation to interact with a second one or more social networks of the plurality of social networks, a second one or more other social networks of the plurality of social networks, or a combination thereof based, at least in part, on the shared content; and in an instance in which the content is determined to be relevant to the first one or more social networks of the plurality of social networks, automatically initiate the first user interaction recommendation to interact with the first one or more social networks.

11. An apparatus of claim 10, wherein the user interaction recommendation is further based, at least in part, on the at least one interaction.

12. An apparatus according to claim 10, wherein the apparatus is further caused to:
determine one or more credentials, one or more network profiles, or a combination thereof associated with the one or more users for the one or more social networks; and
process the one or more credentials, the one or more network profiles, or a combination thereof to determine content associated with the one or more users,
wherein the data associated with the one or more social networks includes, at least in part, the content.

13. An apparatus according to claim 10, wherein the apparatus is further caused to determine one or more hierarchical levels of description for the one or more social networks, the one or more other social networks, or a combination thereof; and
cause, at least in part, the generation of the one or more latent models based, at least in part, on the one or more hierarchical levels,
wherein the one or more hierarchical levels are based, at least in part, on the data associated with the one or more social networks, the content, or a combination thereof.

14. An apparatus according to claim 10, wherein the apparatus is further caused to:
determine additional content associated with the one or more users, the one or more social networks, or a combination thereof; and
cause, at least in part, one or more updates of the one or more corresponding latent models based, at least in part, on the additional content.

15. An apparatus according to claim 12, wherein the apparatus is further caused to:
determine a quorum of the one or more credentials, the one or more network profiles, or a combination thereof; and cause, at least in part, the generation of the one or more latent models based, at least in part, on the quorum.

16. An apparatus according to claim 12, wherein the apparatus is further caused to:
in an instance wherein the one or more devices are determined to be associated with the one or more users, determine one or more preloaded latent models on the one or more devices;
cause, at least in part, at least one modification of the one or more preloaded latent models based, at least in part, on the one or more credentials, the one or more network profiles, or a combination thereof,
wherein the at least one modification occurs periodically, according to a schedule, on demand, or a combination thereof.

17. An apparatus of claim 16, wherein the apparatus is further caused to:
determine one or more other latent models from the one or more social networks, the one or more other social networks, or a combination thereof,
wherein the at least one modification includes, at least in part, an addition of the one or more other latent models to the one or more devices.

18. An apparatus according to claim 10, wherein the one or more latent models include, at least in part, at least one topic list, at least one index, or a combination thereof associated with the one or more hierarchical levels.

19. An apparatus according to claim 10, wherein the apparatus is a mobile phone further comprising:
user interface circuitry and user interface software configured to facilitate user control of at least some functions of the mobile phone through use of a display and configured to respond to user input; and
a display and display circuitry configured to display at least a portion of a user interface of the mobile phone, the display and display circuitry configured to facilitate user control of at least some functions of the mobile phone.

20. A non-transitory computer-readable storage medium carrying one or more sequences of one or more instructions which, when executed by one or more processors, cause an apparatus to recommend social networks for one or more users by causing the apparatus to perform at least the following:
determining a plurality of social networks associated with one or more users, one or more devices associated with the one or more users, or a combination thereof;
generating one or more latent models by causing the one or more processors to process data associated with the plurality of social networks, the one or more latent models describing the plurality of social networks in terms of at least one of content type, content titles, content categories or types of users;
causing a first presentation of a first user interaction recommendation to interact with a first one or more social networks of the plurality of social networks, a first one or more other social networks of the plurality of social networks, or a combination thereof based, at least in part, on the one or more latent models;
in an instance wherein the one or more devices are determined to be associated with the one or more users, determining at least one interaction with one or more applications rendering content on the one or more devices;
in an instance in which the content is determined to be previously shared by the one or more users, causing a second presentation of a second user interaction recommendation to interact with a second one or more social networks of the plurality of social networks, a second one or more other social networks of the plurality of social networks, or a combination thereof based, at least in part, on the shared content; and in an instance in which the content is determined to be relevant to the first one or more social networks of the plurality of social networks, automatically initiating the first user interaction recommendation to interact with the first one or more social networks.

* * * * *